(12) United States Patent
Thomsen et al.

(10) Patent No.: US 7,049,003 B2
(45) Date of Patent: May 23, 2006

(54) METHOD OF MANUFACTURING WINDSHIELD USING ION BEAM MILLING OF GLASS SUBSTRATE(S)

(75) Inventors: Scott V. Thomsen, Milford, MI (US); Rudolph Hugo Petrmichl, Ann Arbor, MI (US); Anthony V. Longobardo, Howell, MI (US); Vijayen S. Veerasamy, Farmington Hills, MI (US); David R. Hall, Jr., Detroit, MI (US); Henry Luten, Ypsilanti, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/735,869

(22) Filed: Dec. 16, 2003

(65) Prior Publication Data

US 2004/0126584 A1    Jul. 1, 2004

Related U.S. Application Data

(62) Division of application No. 10/074,685, filed on Feb. 14, 2002, now Pat. No. 6,740,211.

(60) Provisional application No. 60/340,248, filed on Dec. 18, 2001.

(51) Int. Cl.
*B32B 9/00* (2006.01)

(52) U.S. Cl. .................. 428/432; 428/432; 428/699; 296/77.1; 296/84.1

(58) Field of Classification Search ................ 428/426, 428/432, 430, 699; 296/77.1, 84.1
See application file for complete search history.

(56) References Cited

U.S. PATENT DOCUMENTS

| | | | |
|---|---|---|---|
| 3,682,528 A | 8/1972 | Apfel et al. | |
| 4,152,188 A | 5/1979 | Friedrich et al. | |
| 4,153,654 A | 5/1979 | Maffitt et al. | |
| 4,278,493 A | 7/1981 | Petvai | |
| 4,368,945 A | * 1/1983 | Fujimori et al. | ............ 359/360 |
| 4,413,877 A | 11/1983 | Suzuki et al. | |
| 4,782,216 A | 11/1988 | Woodard | |
| 4,820,902 A | 4/1989 | Gillery | |
| 4,898,789 A | 2/1990 | Finley | |
| 4,965,121 A | 10/1990 | Young et al. | |
| 5,268,217 A | 12/1993 | Kimock et al. | |
| 5,332,888 A | 7/1994 | Tausch et al. | |
| 5,376,455 A | 12/1994 | Hartig et al. | |
| 5,377,045 A | 12/1994 | Wolfe et al. | |
| 5,378,527 A | 1/1995 | Nakanishi et al. | |
| 5,443,669 A | 8/1995 | Tünker | |
| 5,443,862 A | 8/1995 | Buffat et al. | |

(Continued)

FOREIGN PATENT DOCUMENTS

EP    0 963 960    12/1999

(Continued)

OTHER PUBLICATIONS

U.S. Appl. No. 10/074,685 filed Feb. 14, 2002.

(Continued)

*Primary Examiner*—Deborah Jones
*Assistant Examiner*—G. Blackwell
(74) *Attorney, Agent, or Firm*—Nixon & Vanderhye P.C.

(57) ABSTRACT

This invention relates to a method of making a laminated window such as a vehicle windshield. At least one of the two glass substrates of the window is ion beam milled prior to heat treatment and lamination. As a result, defects in the resulting window and/or haze may be reduced.

3 Claims, 12 Drawing Sheets

U.S. PATENT DOCUMENTS

| | | | |
|---|---|---|---|
| 5,508,368 A | 4/1996 | Knapp et al. | |
| 5,514,476 A | 5/1996 | Hartig et al. | |
| 5,521,765 A | 5/1996 | Wolfe | |
| 5,557,462 A | 9/1996 | Hartig et al. | |
| 5,563,734 A | 10/1996 | Wolfe et al. | |
| 5,635,245 A | 6/1997 | Kimock et al. | |
| 5,653,812 A | 8/1997 | Petrmichl et al. | |
| 5,662,877 A | 9/1997 | Shibahara et al. | |
| 5,770,321 A | 6/1998 | Hartig et al. | |
| 5,888,593 A | 3/1999 | Petrmichl et al. | |
| 6,002,208 A | 12/1999 | Maishev et al. | |
| 6,059,909 A | 5/2000 | Hartig et al. | |
| 6,132,881 A | 10/2000 | Hartig et al. | |
| 6,180,247 B1 | 1/2001 | Szczyrbowski et al. | |
| 6,236,543 B1 | 5/2001 | Han et al. | |
| 6,261,672 B1 | 7/2001 | de Paoli | |
| 6,261,693 B1 | 7/2001 | Veerasamy | |
| 6,280,834 B1 | 8/2001 | Veerasamy et al. | |
| 6,280,847 B1 | 8/2001 | Corkhill et al. | |
| 6,284,377 B1 | 9/2001 | Veerasamy | |
| 6,303,225 B1 | 10/2001 | Veerasamy | |
| 6,303,226 B1 | 10/2001 | Veerasamy | |
| 6,312,808 B1 | 11/2001 | Veerasamy et al. | |
| 6,368,664 B1 | 4/2002 | Veerasamy et al. | |
| 6,492,619 B1 * | 12/2002 | Sol | 219/203 |
| 2002/0081378 A1 | 6/2002 | Veerasamy et al. | |

FOREIGN PATENT DOCUMENTS

WO      WO 01/36342      5/2001

OTHER PUBLICATIONS

U.S. Appl. No. 09/703,709 filed Nov. 2, 2000.

"Optical Interference Coatings", Technical Digest 1995, vol. 17, pp. 115-117.

"Surface Hardening of Ceramic and Glass Materials", vol. 36, No. 03, Mar. 1993, p. 291.

"Preparation and Properties of Highly Tetrahedral Hydrogenated Amorphous Carbon", Weiler et al., vol. 53, No. 3, Jan. 1996, pp. 1594-1608.

"Highly Tetrahedral, Diamond-Like Amorphous Hydrogenated Carbon Prepared from a Plasma Beam Source", Weiler et al., May 1994, No. 21.

International Search Report dated Mar. 27, 2003.

* cited by examiner

METHOD OF MANUFACTURING WINDSHIELD USING ION BEAM MILLING OF GLASS SUBSTRATE(S)

CROSS-REFERENCE TO RELATED APPLICATIONS

This application is a division of U.S. Ser. No. 10/074,685, filed Feb. 14, 2002 now U.S. Pat. No. 6,740,211, which claims priority on U.S. Provisional Application 60/340,248, filed Dec. 18, 2001, the disclosures of which are hereby incorporated herein by reference.

BACKGROUND OF THE INVENTION

Vehicle windshields typically include a pair of bent glass substrates laminated together via a polymer interlayer such as polyvinyl butyral (PVB). It is known that one of the two glass substrates may have a coating (e.g., low-E coating) thereon for solar control purposes such as reflecting IR and/or UV radiation, so that the vehicle interior can be more comfortable in certain weather conditions.

Conventional windshields are made as follows. First and second flat glass substrates are provided, one of them having a low-E coating sputtered thereon. The pair of glass substrates are washed and booked together (i.e., stacked on one another), and then while booked are heat bent together into the desired windshield shape at a high temperature(s) (e.g., 8 minutes at about 600–625 degrees C.). The two bent glass substrates are then laminated together via the polymer interlayer to form the vehicle windshield.

Unfortunately, yields for such windshields are often as low as 70% (i.e,. up to 30% may have to be thrown out). These rather low yields are caused by a number of factors, some of which are now described.

The glass substrates are typically made by the known float process which is very efficient and effective. During the glass making process, $SO_2$ is often used and tends to collect on the non-tin side of the glass. The presence of $SO_2$ deposits at the glass surface is not an immediate problem, but upon heat treatment (HT) at the high glass bending temperatures mentioned above the presence of this material can cause blemishes or imperfections (e.g., sometimes known as fish-eyes) to appear in the final vehicle windshield. Other undesirable surface deposits which can occur on the glass surface and which may ultimately cause significant blemishes or imperfections in a resulting windshield include: suction cup marks made during handling, grease pencil marks, glove marks, spray paint marks, scratch(es), thin film(s) of impurities, stains, oil/grease, and/or the like. Again, one or more of these undesirable deposits can result in windshield blemish(es) which may cause the windshield to have to be thrown away thereby resulting in low yields at a significant cost to the windshield manufacturer.

In view of the above, a need in the art exists for improving yields in vehicle windshield production and/or reducing the occurrence of significant blemishes in vehicle windshields (e.g. fish-eyes). It is an object of certain embodiments of this invention to fulfill one or more of these needs, and/or other needs which may become apparent to the skilled artisan from the description herein.

BRIEF SUMMARY OF THE INVENTION

An object of this invention is to provide a method of making vehicle windshields and/or other laminated windows in an improved manner.

Another object of this invention is to provide a method of making vehicle windshields and/or other laminated windows in a manner so as to improve production yields and/or reduce the occurrence of significant blemish(es) or imperfections therein.

Another object of this invention is to, in a method of making a vehicle windshield or other laminated window, ion beam mill a surface of at least one of the glass substrates prior to lamination in order to remove certain undesirable surface deposits. Advantageously, such ion beam milling has been found to improve yields and/or improve window quality.

Another object of this invention is to fulfill one or more of the above-listed objects and/or needs.

Generally speaking, certain example embodiments of this invention fulfill one or more of the above listed objects and/or needs by providing a method of making a vehicle windshield, the method comprising: providing first and second glass substrates; on beam milling at least one surface of the first glass substrate so as to remove at least 2 Å of class from at least a portion of the first substrate and form an ion beam milled surface of the first substrate; sputtering a coating, including at least one infrared (IR) reflecting layer, on the ion beam milled surface of the first substrate; and laminating the first substrate with the coating thereon to the second substrate via a polymer inclusive interlayer so that the coating and the interlayer are provided between the first and second substrates.

Other example embodiments of this invention fulfill one or more of the above listed objects and/or needs by providing a method of making a laminated window, the method comprising: providing first and second glass substrates; ion beam milling at least one surface of the first glass substrate so as to remove at least 2 Å of glass from at least a portion of the first substrate and form an ion beam milled surface of the first substrate; forming a coating on the ion beam milled surface of the first substrate; and laminating the first substrate with the coating thereon to the second substrate via a polymer inclusive interlayer so that the coating and the interlayer are provided between the first and second substrates.

Still other example embodiments of this invention fulfill one or more of the above-listed objects and/or needs by providing a vehicle windshield comprising: first and second glass substrates laminated to one another via a polymer inclusive interlayer; wherein at least one surface of the first glass substrate is ion beam milled; and wherein the windshield has a visible transmittance of at least 70%.

Yet other example embodiments of this invention fulfill one or more of the above-listed objects and/or needs by providing a method of making a vehicle windshield with reduced haze, the method comprising: ion beam milling a first substrate, laminating the first substrate to a second substrate via an interlayer to form the windshield, and wherein the ion beam milling causes haze in the windshield to be reduced by at least 20%.

Still other example embodiments of this invention fulfill one or more of the above-listed objects by providing a method of making a window unit, the method comprising: providing first and second glass substrates; ion beam milling at least one surface of the first glass substrate so as to remove at least 2 Å of glass from at least a portion of the first substrate and form an ion beam milled surface of the first substrate; forming a coating on the ion beam milled surface of the first substrate; and coupling the first substrate with the coating thereon to the second substrate so that the coating is provided between the first and second substrates. In this regard, the window unit may be a vehicle windshield, an insulating glass (IG) window unit, or any other type of window unit.

DETAILED DESCRIPTION OF THE INVENTION

Figure 1:
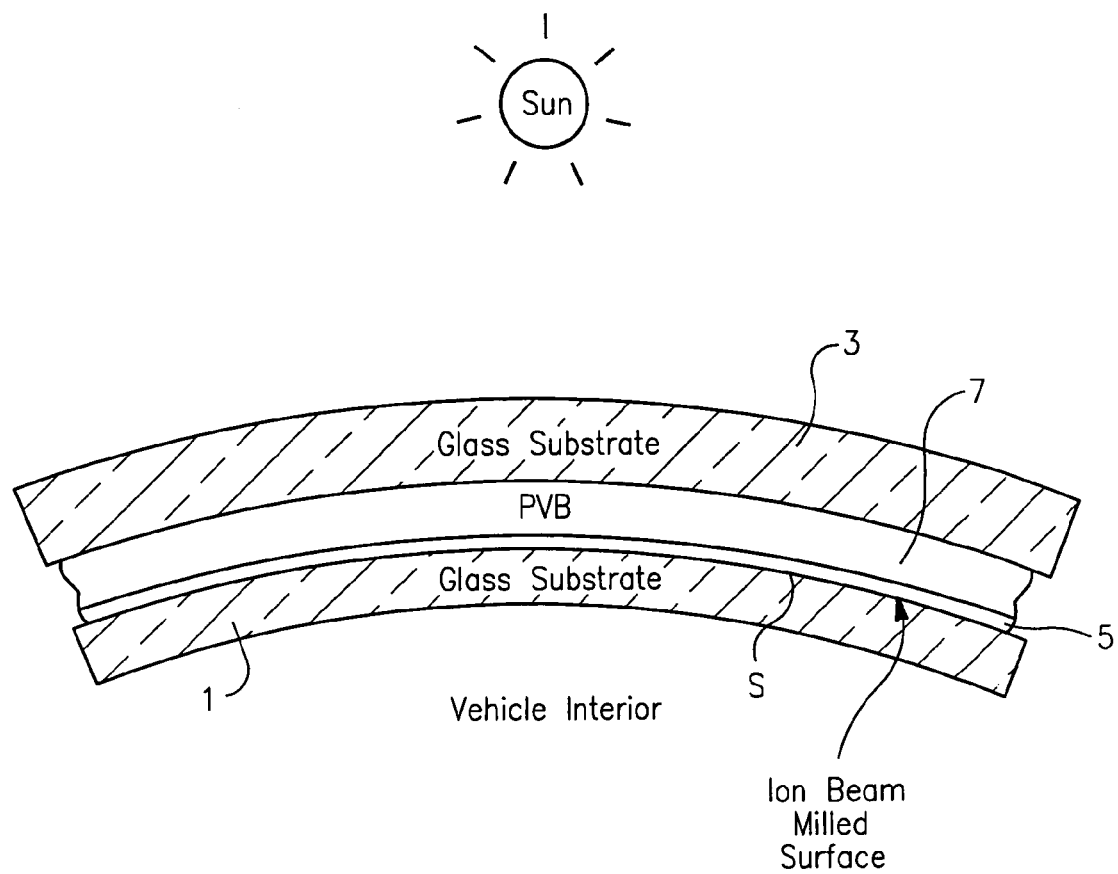
FIG. 1 is a cross sectional view of a vehicle windshield according to an embodiment of this invention.

Referring now more particularly to the accompanying drawings in which like reference numerals indicate like parts/steps through the several views.

Certain example embodiments of this invention relate to a method of making a vehicle windshield or other laminated window. In certain embodiments, one or both of the glass substrates is ion beam milled (i.e., in order to remove some of the glass from the substrate surface) prior to lamination. This ion beam milling has been found to reduce the likelihood of significant blemishes in final products, thereby improving yields, presumably because the ion beam milling acts to remove certain undesirable surface deposits that were present on the glass surface prior to the milling (e.g., $SO_2$, suction cup marks, grease pencil marks, stains, glove marks, spray paint marks, scratches, and/or the like). By removing such undesirable deposits from the glass surface prior to heat treatment (e.g., heat bending and/or thermal tempering), blemishes and/or defects arising from such deposits can be reduced and/or eliminated in the final product. The embodiments described herein are provided for purposes of example only, and are not intended to be limiting unless specifically claimed.

Raw defects such as cutting oil, suction cup marks, or G-cor oil are problematic as discussed above, but may often be picked up by optical robot detector(s) and are not a problematic as more difficult to detect soft defects (e.g., thin films of impurities). It has been found that the ion beam milling of the instant invention is good at reducing or eliminating these tough to detect soft defects, thereby improving yields of the resulting products (e.g., vehicle windshields).

FIG. 1 is a side cross sectional view of a vehicle windshield according to an example embodiment of this invention. The windshield includes first and second bent glass substrates 1 and 3, respectively, a coating (e.g., low-E coating) 5 provided on interior glass substrate 1, and a polymer based interlayer 7 (e.g., including PVB (polyvinyl butyral) or any other suitable polymer interlayer material) for laminating the two substrates together as illustrated. In this particular embodiment, it can be seen that coating 5 is provided on the interior glass substrate 1 which is adjacent to the vehicle interior; and coating 5 is located so as to face the interlayer 7 and the opposing substrate 3 so that the coating 5 is between the two substrates 1 and 3.

Substrates 1 and 3 are preferably glass (e.g., soda lime silica glass) made via any suitable process (e.g., float process). The glass substrates 1 and 3 may be clear or colored (e.g., green, grey, blue, etc.) in different embodiments of this invention. While the glass substrates/sheets 1 and 3 are illustrated as being bent in the FIG. 1 embodiment, it is recognized that they may instead be flat in other embodiments of this invention where flat windshields or flat windows are desired. Polymer inclusive or polymer based interlayer 7 may include or be of PVB in certain embodiments of this invention, or alternatively may be of or include any other suitable polymer inclusive interlayer material in other embodiments of this invention.

Coating 5 may be any suitable solar control coating, including but not limited to any suitable low-emissivity (low-E) coating that reflects infrared (IR) and/or ultraviolet (UV) radiation. For example, and without limitation, low-E coating 5 may be or comprise any of the coatings described and/or illustrated in any of U.S. Pat. Nos. 5,557,462, 5,770,321, 5,514,476, 5,376,455, 6,132,881, 6,059,909, 4,898,789, 4,413,877, or 3,682,528, all of which are hereby incorporated herein by reference. Alternatively, coating 5 may be or comprise any of the coatings described or illustrated in any of U.S. patent application Ser. Nos. 09/794,224, 09/778,949, 09/793,406, or 09/797,903, all of which are hereby incorporated herein by reference. In still further alternative embodiments of this invention, any other solar control coating may be used as coating 5. While coating 5 is illustrated as being on the surface of only substrate 1 in the FIG. 1 embodiment, those skilled in the art will recognize that another coating 5 could also be provided on the interior surface of the other substrate 3 adjacent the PVB layer 7.

In certain embodiments of this invention, it has been found that ion beam milling of substantially the entire surface S of substrate 1 prior to sputter deposition of coating 5 thereon, and thus prior to heat treatment and lamination, enables reduction and/or elimination of certain blemishes and/or defects in the final product, and/or can reduce undesirable haze in the final product. As will be described in more detail below, impingement of an ion beam from an ion beam source(s) on the surface S of substrate 1 causes a certain portion of the glass at the substrate surface to be milled/sputtered off (i.e., removed). The amount of glass removed from substrate 1 during the ion beam milling is a function of, for example, the ion energy used, angle of incidence of the ion beam on the substrate surface S, the speed that the substrate passed under the ion beam, the feedstock gas(es) used in the ion beam source, the type of ion beam source used, and/or the type of glass being milled.

Good results (i.e., good reduction in defects and/or reduction of haze) occur when the ion beam milling: removes at least about 2 Å of glass from surface S of substrate 1, more preferably removes at least about 5 Å of glass from surface S of substrate 1, even more preferably removes from about 5–500 Å of glass from surface S of substrate 1, still more preferably from about 10–100 Å of glass from surface S of substrate 1, and most preferably from about 20–80 Å of glass from surface S of substrate 1.

Glass substrates 1 and/or 3 may be made via the known float process in which a tin bath is utilized. It will thus be appreciated by those skilled in the art that as a result of forming the glass substrates 1 and/or 3 on molten tin in certain exemplary embodiments, small amounts of tin or tin oxide may migrate into surface areas of the glass on the side of the glass that was in contact with the tin bath during manufacture (i.e., typically, float glass may have a tin oxide concentration of 0.05% or more (wt.) in the first few microns below the surface that was in contact with the tin bath). In this regard, in certain example non-limiting embodiments of this invention, surface S of substrate 1 which is ion beam milled is the non-tin side/surface of the substrate 1 (i.e., the tin side of substrate 1 is adjacent/in the vehicle interior and faces away from the polymer based interlayer 7 in the FIG. 1 embodiment).

While FIG. 1 illustrates only the non-tin surface S of substrate 1 being ion beam milled, it will be recognized that other ion beam milling may be carried out in other embodiments of this invention. For example, in certain embodiments of this invention, both surface S of substrate 1 and the surface of substrate 3 facing layer 7 may be ion beam milled as described herein. In other embodiments of this invention, both surface S of substrate 1 and the exterior surface of substrate 3 may be ion beam milled as described herein. Optionally, the tin-side surface of substrate 1 (i.e., which faces the vehicle interior in the FIG. 1 embodiment) may also be ion beam milled.

Figure 2:
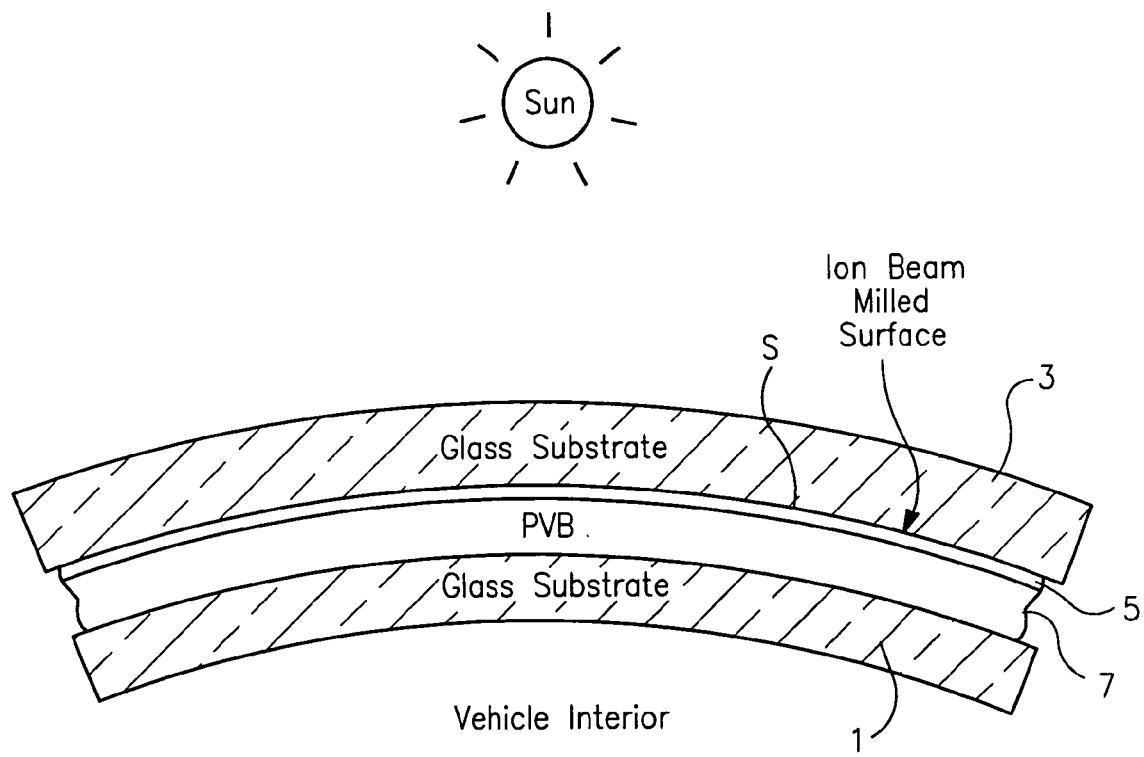
FIG. 2 is a cross sectional view of a vehicle windshield according to another embodiment of this invention.

FIG. 2 is a side cross sectional view of a vehicle windshield according to another embodiment of this invention. The FIG. 2 embodiment is similar to the FIG. 1 embodiment described above, except that the coating 5 is provided on the exterior glass substrate 3 instead of on the interior substrate 1. Thus, in this embodiment, the ion beam milling is performed on the non-tin side surface S of substrate 3 on which coating 5 is to be sputtered or otherwise deposited.

Figure 3:
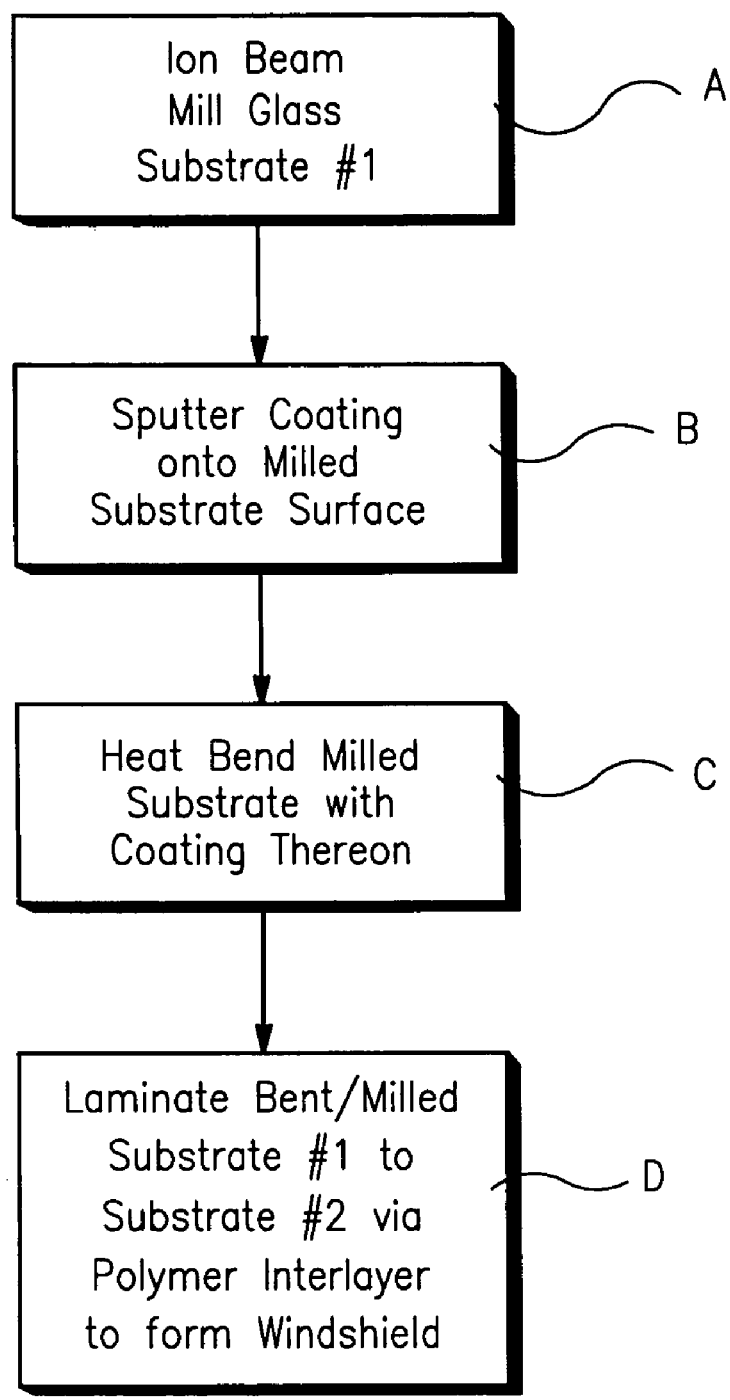
FIG. 3 is a flowchart illustrating certain steps carried out in making a vehicle windshield according to any embodiment herein.

FIG. 3 is a flowchart illustrating steps taken in making a vehicle windshield (or other laminated window) according to either the FIG. 1 or FIG. 2 embodiment(s) of this invention. In step A, a first glass substrate (flat or bent) is ion beam milled (e.g., in the FIG. 1 embodiment at least surface S of substrate 1 is milled; while in the FIG. 2 embodiment at least surface S of substrate 3 is milled in this step). Thereafter, in step B a coating 5 is deposited (e.g., sputtered) onto the ion beam milled surface S of the first glass substrate. Then, in step C the ion beam milled and coated substrate is heat treated and bent into the desired windshield shape (either alone or together with another substrate). During such heat bending, the glass substrate(s) are heated to temperature(s) of from 570–900 degrees C., more preferably from 580–800 degrees C., for at least 2 minutes, more preferably for at least 5 minutes, so as to enable glass bending and/or tempering. After the ion beam milled and coated glass substrate has been heat bent, in step D it is laminated to another heat bent glass substrate via a polymer based interlayer (e.g., PVB inclusive layer 7) to form the resulting vehicle windshield.

Figure 4:
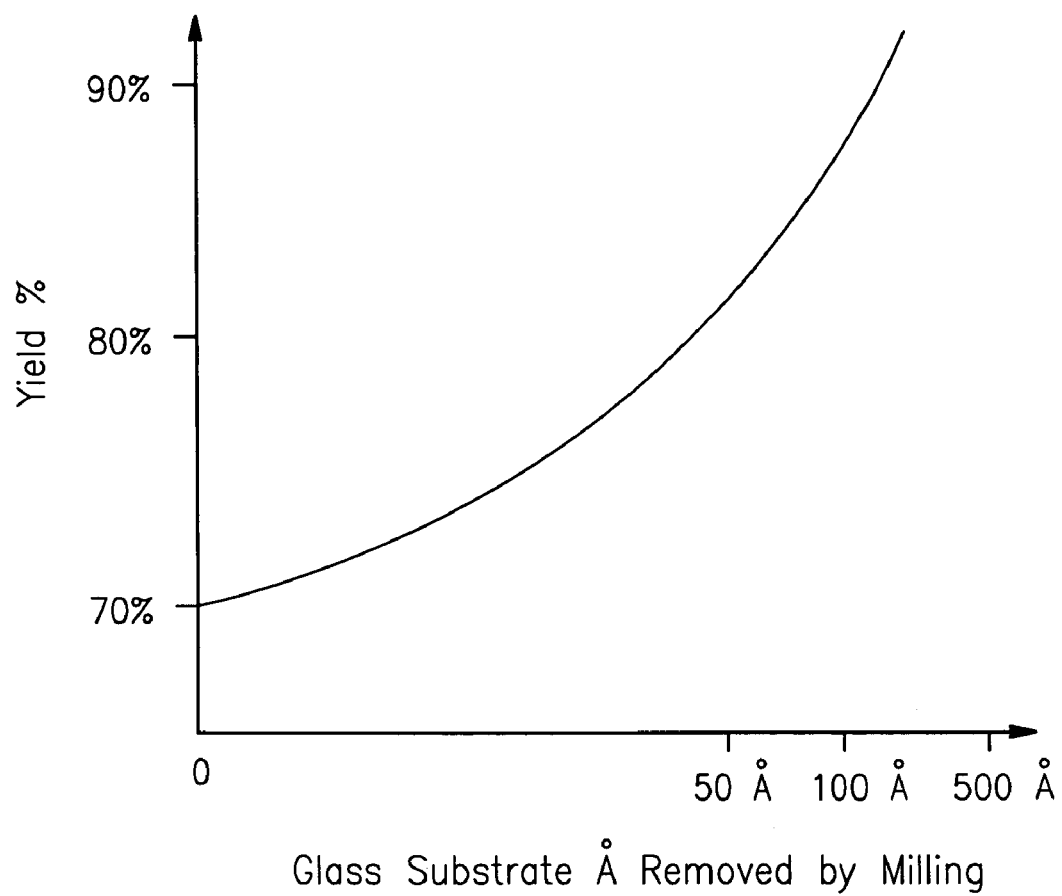
FIG. 4 is a graph (thickness of glass substrate removed by ion beam milling vs. windshield yield %) illustrating that ion beam milling improves yields according to certain example embodiments of this invention.

FIG. 4 is a graph illustrating that ion beam milling of surface S of a substrate (according to either the FIG. 1 or FIG. 2 embodiment(s)) improves the yield % of the resulting vehicle windshield given a know standard of acceptance. As can be seen, even a small amount of ion beam milling removes sufficient undesirable deposits to improve yield to some extent, while additional milling (e.g., from 50–100 Å) significantly improves yield by further reducing the likelihood of product defects/blemishes.

Figure 5:
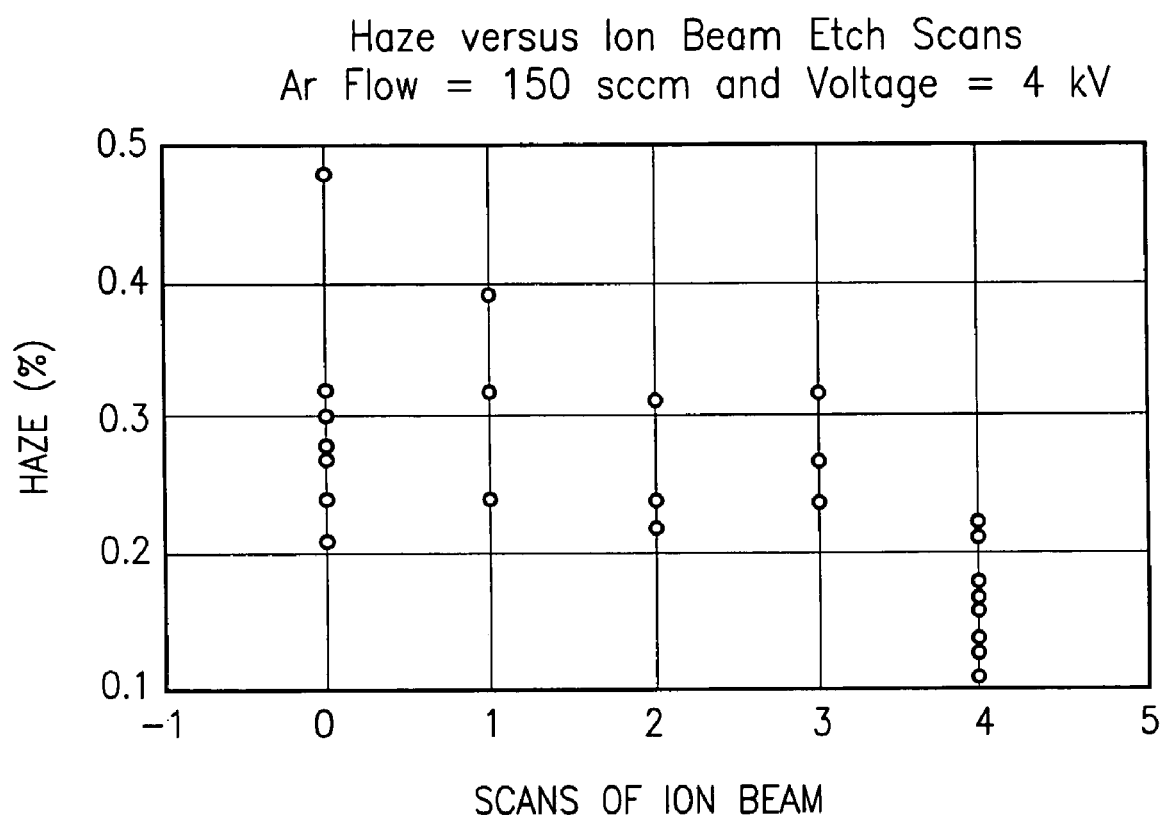
FIG. 5 is a graph (ion beam scans vs. haze %) illustrating that ion beam milling reduces haze in resulting windshields in certain example embodiments of this invention.

FIG. 5 is a graph illustrating that, surprisingly, certain amounts of ion beam milling of surface S of a substrate reduces the occurrence of undesirable haze in the final windshield product. For the examples making up FIG. 5, 150 sccm Ar feedstock gas was used in the ion beam source at a pressure of 2.25 mTorr (four vacuum pumps operating), a 4015 V potential was applied to the anode to achieve discharge current of 1.782 A, the glass substrate was moved at a linear velocity of 100 inches/minute beneath the ion beam source, and the ion beam was incident on the substrate at an angle θ of 45 degrees. The samples were exposed to different numbers of ion beam milling passes to see the results of different amounts of ion beam milling upon haze reduction. After milling, a titanium oxide coating was applied to the milled substrate. As shown in FIG. 5, the samples exposed to four ion beam passes for milling had much less haze than the samples not ion beam milled. Freshly produced glass typically has a haze value of 0.05 to 0.08%, while long-time stored glass can have haze values of 2–10%. Thus, ion beam milling a surface of a glass substrate (tin side and/or non-tin side) can be used to reduce haze (e.g., to the values shown in FIG. 5). The use of ion beam milling according to certain embodiments of this invention may be used in combination with the FIGS. 1–2 embodiments herein, or separate and independent thereof in other glass window applications.

With respect to haze, in certain embodiments of this invention, ion beam milling is performed on a glass substrate surface (see milling amounts above with respect to glass removed) in order to reduce haze by at least 10%, more preferably so as to reduce haze by at least 20%, and even more preferably to reduce haze by at least 50%.

Figure 6:
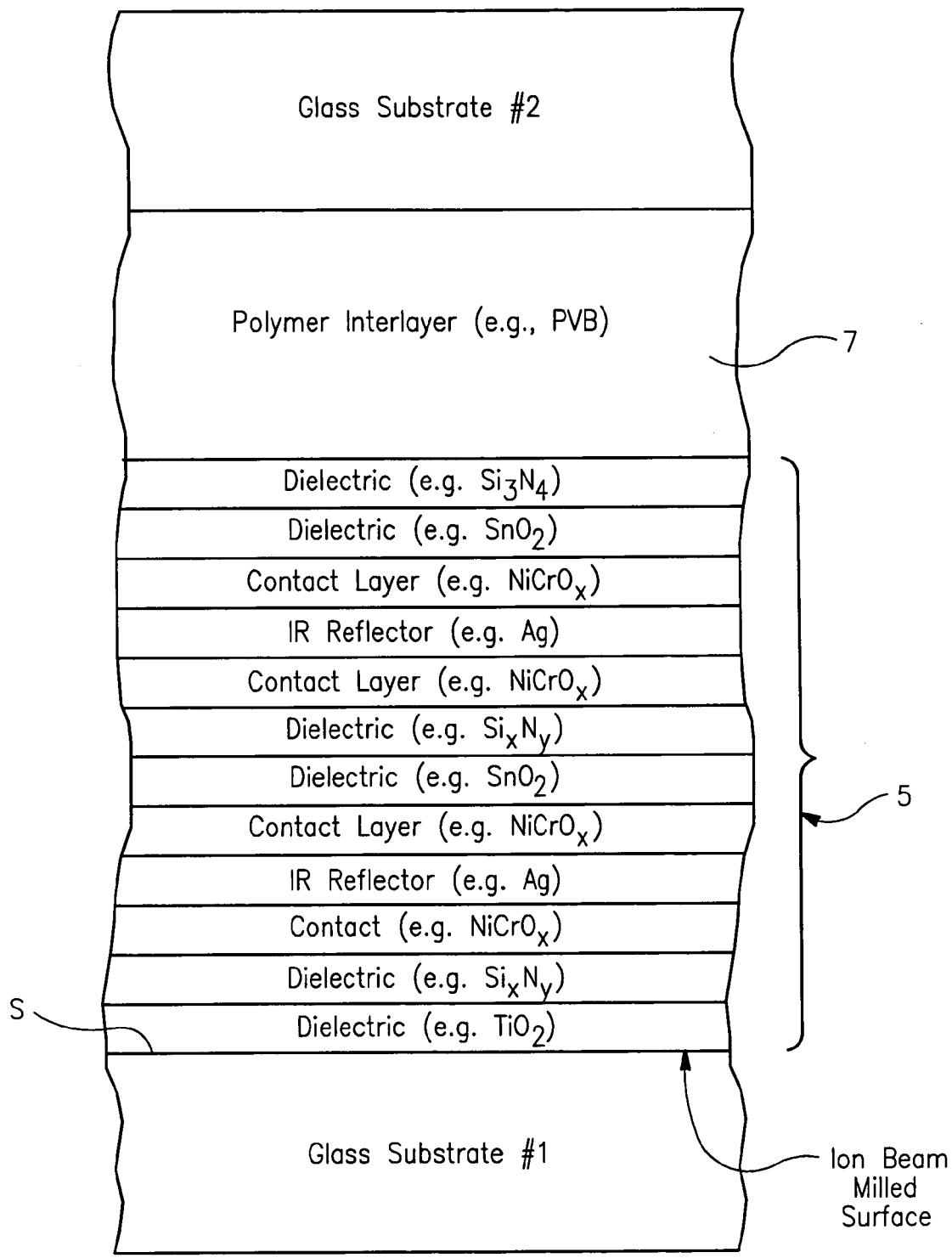
FIG. 6 is a cross sectional view of a vehicle windshield or other window according to an example embodiment of this invention.

While many different types of coatings 5 may be used in either of the FIG. 1 or FIG. 2 embodiments of this invention, FIG. 6 illustrates an example of one such coating. As illustrated, the multi-layer coating 5, including multiple IR reflecting Ag layers, is provided on the first substrate (either substrate 1 or 3) over the ion beam milled surface S thereof. The milled and coated substrate is then laminated to the other substrate (the other of 1 or 3) via polymer based interlayer 7. The low-E coating 5 of the FIG. 6 embodiment includes, from the glass substrate #1 outwardly, the following layers:

TABLE 1

(Example Coating Materials/Thicknesses; FIG. 6 Embodiment)

| Layer | Preferred Range ( ) | More Preferred ( ) | Example (Å) |
|---|---|---|---|
| $TiO_2$ | 0–400 | 50–250 | 100 Å |
| $Si_xN_y$ | 0–400 | 50–250 | 170 Å |
| $NiCrO_x$ | 5–100 | 10–50 | 18 Å |
| Ag | 50–250 | 80–120 | 105 Å |
| $NiCrO_x$ | 5–100 | 10–50 | 16 Å |
| $SnO_2$ | 0–800 Å | 500–850 Å | 650 Å |
| $Si_xN_y$ | 0–800 | 50–250 | 170 Å |
| $NiCrO_x$ | 5–100 | 10–50 | 18 Å |
| Ag | 50–250 | 80–120 | 105 Å |
| $NiCrO_x$ | 5–100 | 10–50 | 16 Å |
| $SnO_2$ | 0–500 Å | 100–300 Å | 150 Å |
| $Si_3N_4$ | 0–500 | 100–300 | 250 Å |

In certain example embodiments of this invention, whether the FIG. 6 coating 5 listed above, or some other coating is provided on the milled substrate, resulting vehicle windshields may be characterized by one or more of the following parameters (as with other characteristics herein, these are non-limiting herein, unless specifically claimed):

TABLE 2

Example Color/Transmission After HT (Laminated Form)

| Characteristic | General | More Preferred |
|---|---|---|
| $T_{vis}$ (Ill. A, 2 deg.): | >=70% | >=75% |
| $T_{vis}$ (Ill. C, 2 deg.): | >=70% | >=75% |
| $R_g Y$ (Ill. A, C; 2 deg.): | <=15% | <=11% |
| $a^*_g$ (Ill. A, C; 2°): | −4.0 to +4.0 | −1.0 to +1.0 |
| $b^*_g$ (Ill. A, C; 2°): | −10.0 to +8.0 | −8.0 to −2.0 |
| $R_f Y$ (Ill. A, C; 2 deg.): | <=15% | <=11% |
| $a^*_f$ (Ill. A, C; 2°): | −6.0 to +6.0 | −2.0 to +2.0 |
| $b^*_f$ (Ill. A, C; 2°): | −5.0 to +5.0 | −4.0 to +3.0 |
| $R_{solar}$: | >=24% | >=28% |
| Haze: | <=0.4 | <=0.3 |
| $T_{solar}$: | <=52% | <=48% |

Figure 7:
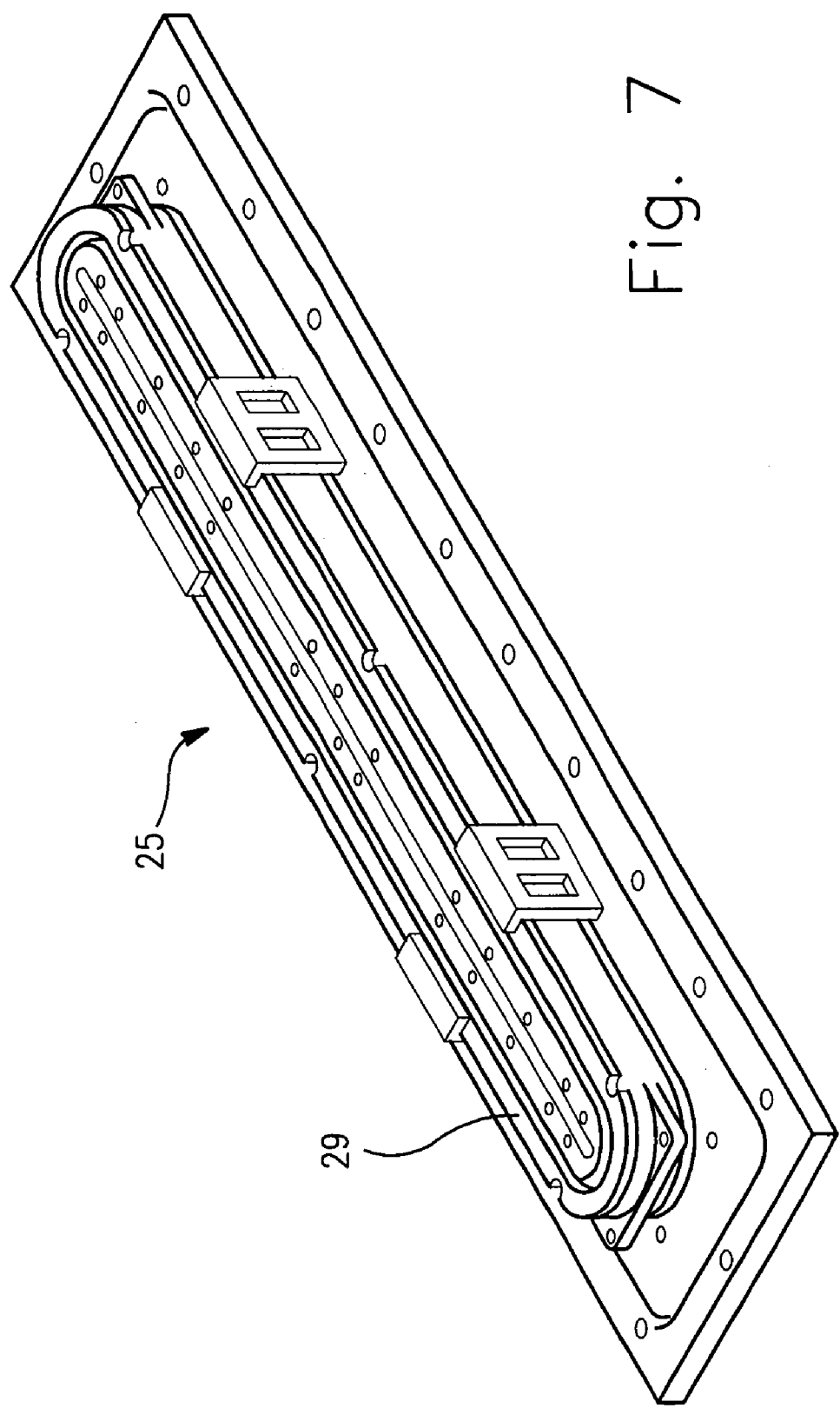
FIG. 7 is a perspective view of an ion beam source which may be used in milling according to an example embodiment of this invention.
Figure 8:
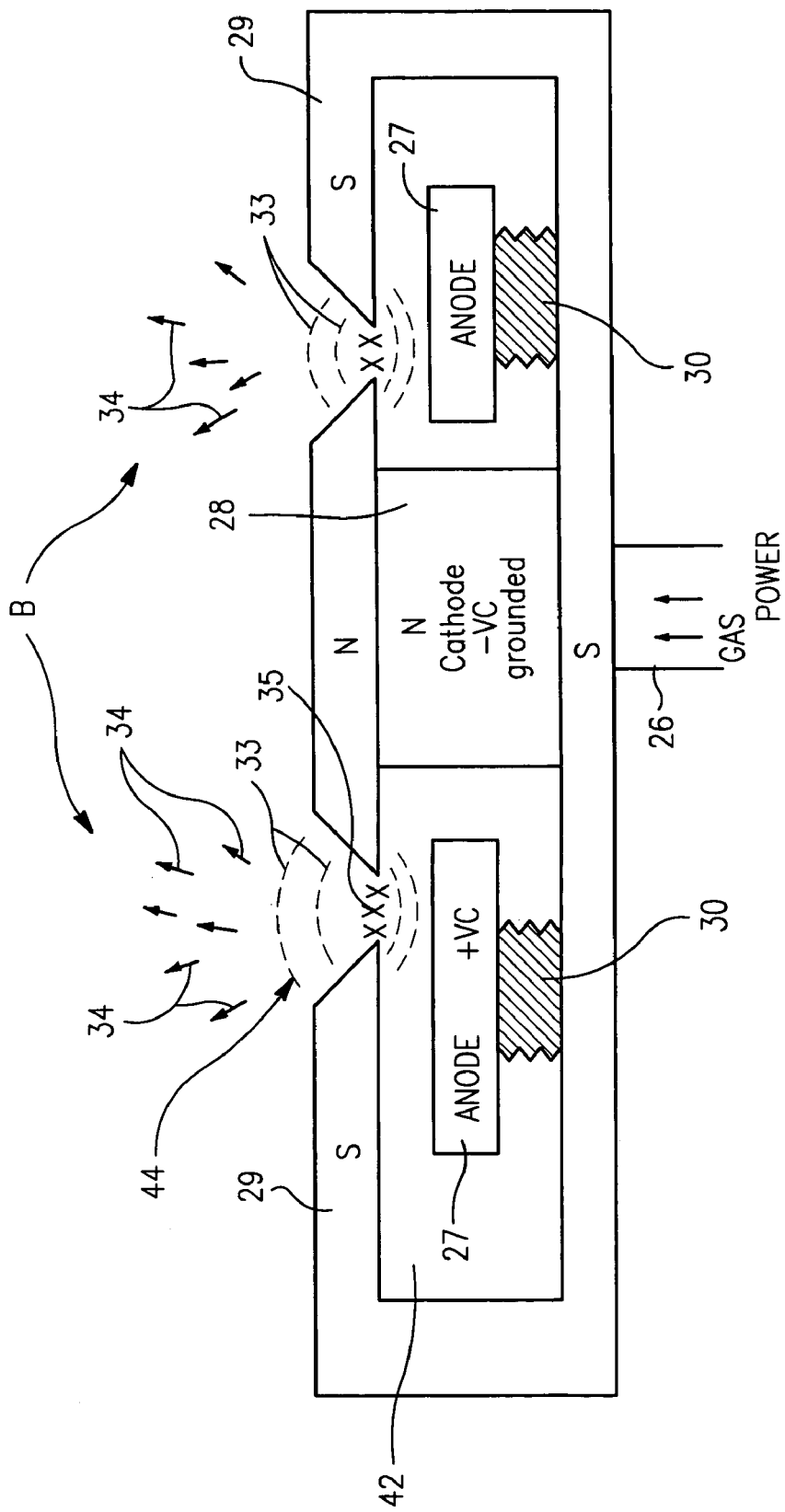
FIG. 8 is a cross sectional view of the ion beam source of FIG. 7.

FIGS. 7–8 illustrate an example linear ion beam source 25 which may be used to ion beam mill a glass substrate(s) 1 and/or 3 herein. One or more sources 25 may be used in different embodiments of this invention, depending upon the application. For example, when much milling is desired, the glass substrate to be milled may be successively passed under two or more different ion beam sources 25 which are in-line with one another. In alternative embodiments of this invention, only a single source 25 need be used. Ion beam source 25 includes gas/power inlet 26, anode 27, grounded cathode magnet portion 28, magnet poles 29, and insulators 30. A 3 kV (or 5 kV or more) DC and/or AC power supply may be used for source 25 in some embodiments. The ion beam B from the source may be focused or non-focused in different embodiments of this invention. Ion beam source 25 is based upon a known gridless ion source design. The linear source includes a linear shell (which is the cathode and grounded) inside of which lies a concentric anode (which is at a positive potential). This geometry of cathode-anode and magnetic field 33 gives rise to a closed drift condition. The anode layer ion source can also work in a reactive mode. The source includes a metal housing with a slit in a shape of a race track as shown in FIGS. 7–8. The hollow housing is at ground potential. The anode electrode is situated within the cathode body (though electrically insulated) and is positioned just below the slit. The anode can be connected to a positive potential as high as 3,000 or more volts (V). Both electrodes may be water cooled in certain embodiments. Feedstock/precursor gases (e.g. Ar is preferred in certain ion beam milling embodiments, although other gases may instead be used in certain embodiments of this invention), described herein, are fed through the cavity between the anode and cathode. The linear ion source also contains a labyrinth system that distributes the precursor gas fairly evenly along its length and which allows it to expand between the anode-cathode space internally. The electrical energy then cracks the gas to produce a plasma within the source. The ions (e.g., Ar+ ions) are expelled out at energies in the order of eVc-a/2 when the voltage is Vc-a. The ion beam emanating from the slit is approximately uniform in the longitudinal direction and has a Gaussian profile in the transverse direction. Exemplary ions 34 in ion beam B are shown in FIG. 8. A source as long as 1–4 meters may be made, although sources of different lengths are anticipated in different embodiments of this invention. Electron layer 35 completes the circuit thereby enabling the ion beam source to function properly. Still referring to FIGS. 7–8, a feedstock gas(es) (e.g. Ar and/or some other inert gas) may be fed through the ion beam source via cavity 42 until it/they reach the area near slit 44 where it/they is/are ionized. Other gas(es) (e.g., another inert gas or oxygen/nitrogen) may be used in addition to Ar in certain alternative embodiments of this invention. The ion beam source of FIGS. 7–8 is merely exemplary. Thus, in alternative embodiments of this invention, an ion beam source device or apparatus as described and shown in FIGS. 1–3 of U.S. Pat. No. 6,002,208 (hereby incorporated herein by reference in its entirety) may be used to ion beam mill substrate 1 and/or 3.

Figure 9:
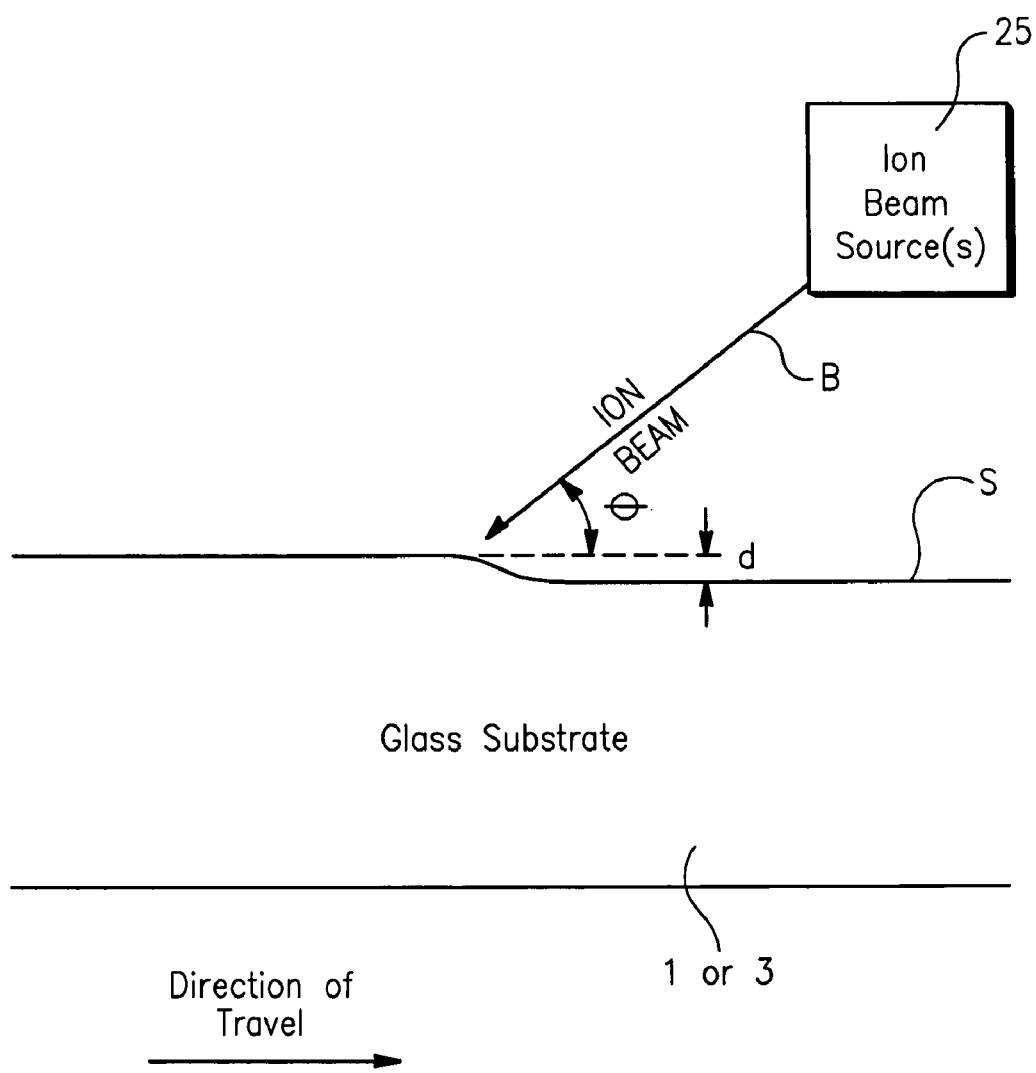
FIG. 9 is a schematic diagram illustrating ion beam milling of a glass substrate according to an example embodiment of this invention.

FIG. 9 illustrates a glass substrate (1 or 3) being ion beam milled according to an example embodiment of this invention using ion source 25. As shown, the ion beam B from ion source 25 is incident upon the surface S of the glass substrate at an angle θ. Beam incidence angle θ, between the ion beam and the substrate surface, may be from about 0–90 degrees in different embodiments of this invention, more preferably from about 20–70 degrees, and most preferably from about 30–60 degrees. Surprisingly, it has been found that an angle of from 20–70 degrees, more preferably from 30–60 degrees, results in more efficient milling of the glass substrate surface S. It can also be seen that ion beam B hitting the glass substrate causes a thickness amount "d" of glass to be milled off of (i.e., removed from) the substrate. As stated above, the ion beam B mills off at least about 2 Å of glass from the substrate, more preferably at least about 5 Å of glass from the substrate, even more preferably from about 5–500 Å of glass from the substrate, still more preferably from about 10–100 Å of glass from the substrate 1, and most preferably from about 20–80 Å of glass from the substrate.

Figure 10:
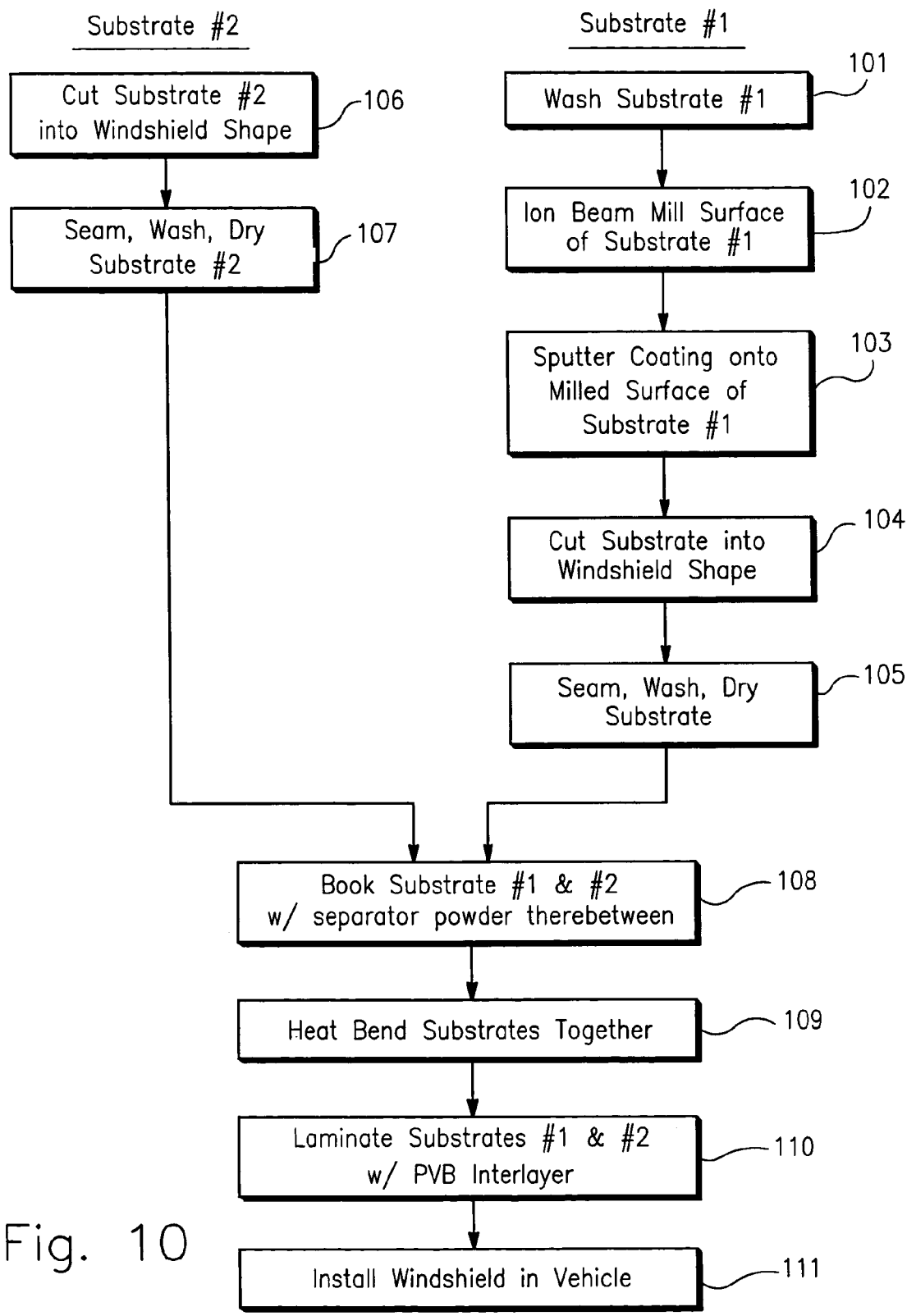
FIG. 10 is a flowchart illustrating certain steps taken in making a vehicle windshield according to an example embodiment of this invention.

While ion beam milling herein may be used to make laminated windows (e.g., architectural windows, vehicle side windows or backlites), a preferred used is for vehicle windshields. FIG. 10 is a flowchart illustrating in detail a example non-limiting way in which a vehicle windshield may be made using ion beam milling according to an embodiment of this invention (this process may be used to make the windshields of any of FIGS. 1, 2 and 6). As illustrate, first and second glass substrates are provided (i.e., substrate #1 and substrate #2). As for the first substrate, it optionally may be washed (step 101). At least one surface of the first substrate is then ion beam milled as shown in FIG. 9 (step 102). A coating 5 is then sputtered onto the ion beam milled surface S of the first substrate (step 103). Optionally, both surfaces of the substrate may be ion beam milled. The coating 5 may be a low-E coating, or any other suitable solar control coating. The ion beam milled and coated first substrate is then cut into the shape to be used in a windshield (step 104). It is then, optionally, seamed, washed and dried (step 105). Meanwhile, a second substrate is cut to size (step 106) and optionally may be seamed, washed and dried (step 107). The second substrate may or may not be ion beam milled (one or both surfaces thereof) in different embodiments of this invention. After both substrates have been cut to size, they are booked with separator powder therebetween (step 108). They are then heat treated and bent into the desired windshield shape (step 109), and laminated together via a polymer based interlayer 7 (step 110). The resulting windshield may then be installed in a vehicle window frame (step 111). This detailed process is provided for purpose of example only, and is not intended to be limiting unless specifically claimed.

Figure 11:
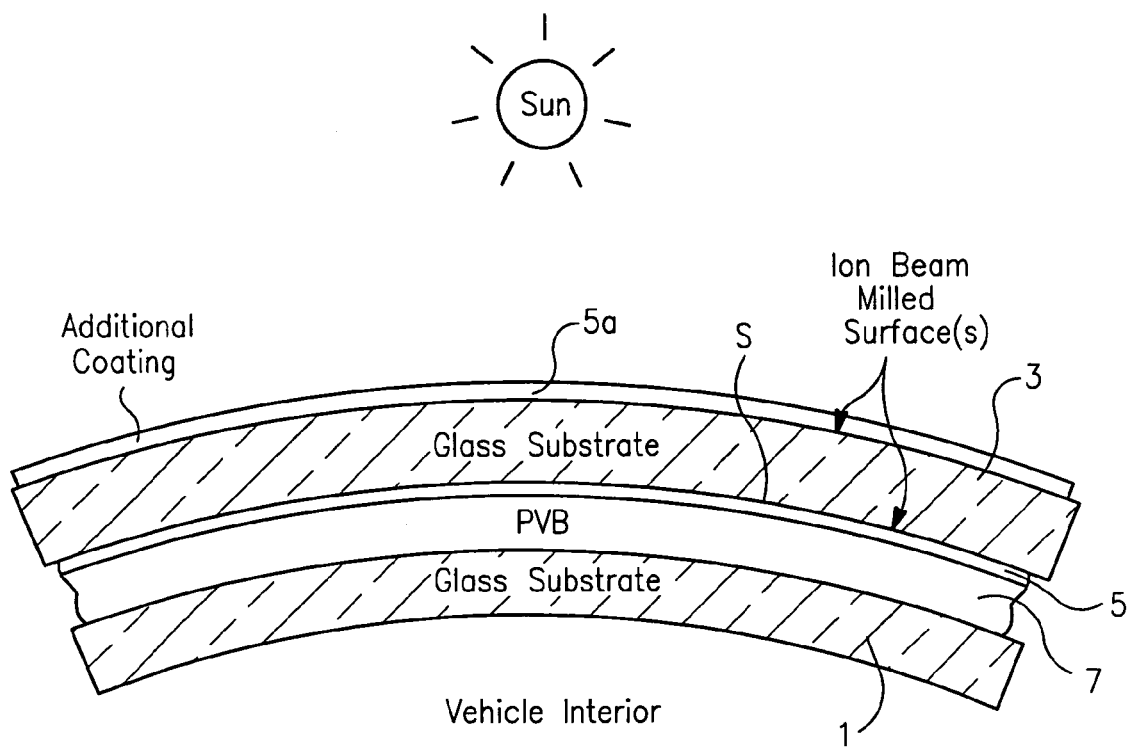
FIG. 11 is a side cross sectional view of a coated article according to another embodiment of this invention.

FIG. 11 is a cross sectional view of a coated article (e.g., vehicle windshield or other window) according to another embodiment of this invention. This embodiment is similar to that of FIG. 2 described above, except that an additional coating 5a is provided on the side of substrate 3 opposite coating 5. Coating 5 may be as described above, while coating 5a on the other side (e.g., the exterior side) of substrate 3 may be of or include diamond-like carbon (DLC) or any other suitable coating that may be hydrophobic (contact angle >=70 degrees), hydrophillic (contact angle <=15 degrees), and/or scratch resistant. In certain embodiments, additional coating 5a may even provide IR and/or UV reflection functionality. Since one of coatings 5 and 5a in the FIG. 11 embodiment is formed on the tin side of the glass substrate 3, ion beam milling is used to remove much tin from the tin side of the glass substrate in order to improve yields and/or optical characteristics/durability of the resulting product. In the FIG. 11 embodiment, both sides of the glass substrate 3 may be ion beam milled as described herein, or alternatively only the tin side of the substrate may be ion beam milled as described herein. In still further alternative embodiments (applicable to IG units and vehicle windshields), coating 5 may be provided on the interior surface of one of the substrates while the additional coating 5a is provided on the exterior surface of the other substrate.

Figure 12:
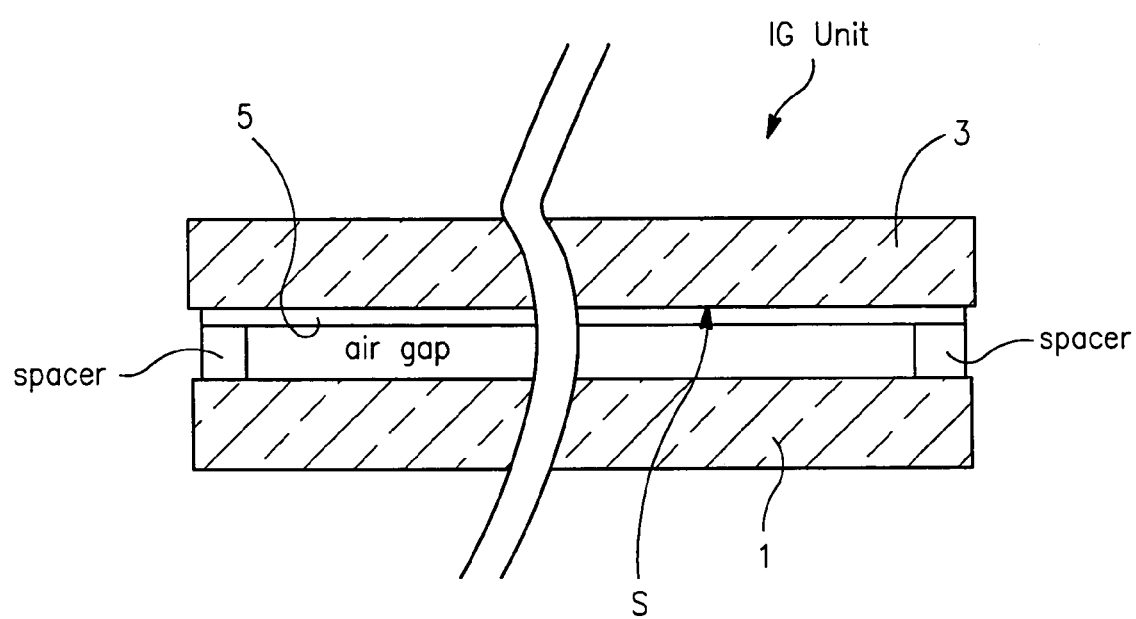
FIG. 12 is a side cross sectional view of an insulating glass (IG) window unit according to another example embodiment of this invention.

While the aforesaid embodiments are directed primarily toward laminated windows, this invention is not so limited unless specifically claimed. In certain alternative embodiments of this invention, the ion beam milling may be used in the context of insulating glass (IG) window units where the two glass substrate are spaced apart from one another via at least one spacer and an air/gas gap (see FIG. 12). In such IG window unit embodiments, a surface of at least one of the substrates to receive a coating 5 (e.g., any of the coatings mentioned above) is ion beam milled as discussed herein.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_XY$ or $R_X$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides. Color characteristics are measured and reported herein using the CIE LAB 1976 a*, b* coordinates and scale.

The terms "emissivity" (or emittance) and "transmittance" are well understood in the art and are used herein according to their well known meaning. Thus, for example, the term "transmittance" herein means solar transmittance, which is made up of visible light transmittance (TY of $T_{vis}$), infrared energy transmittance ($T_{IR}$), and ultraviolet light transmittance ($T_{uv}$). Total solar energy transmittance (TS or $T_{solar}$) can be characterized as a weighted average of these other values. With respect to these transmittances, visible transmittance may be characterized for architectural purposes by the standard Illuminant C, 2 degree technique; while visible transmittance may be characterized for automotive purposes by the standard Ill. A 2 degree technique (for these techniques, see for example ASTM E-308-95). For purposes of emissivity a particular infrared range (i.e. 2,500–40,000 nm) is employed.

The term $R_{solar}$ refers to total solar energy reflectance (glass side herein), and is a weighted average of IR reflectance, visible reflectance, and UV reflectance. This term may be calculated in accordance with the known DIN 410 and ISO 13837 (12/98) Table 1, p. 22 for automotive applications, and the known ASHRAE 142 standard for architectural applications.

"Haze." Light diffused in many directions causes a loss in contrast. The term "haze" is defined herein in accordance with ASTM D 1003 which defines haze as that percentage of light which in passing through deviates from the incident beam greater than 2.5 degrees on the average. "Haze" may be measured herein by a Byk Gardner haze meter (all haze values herein are measured by such a haze meter and are unitless).

Another term employed herein is "sheet resistance". Sheet resistance ($R_S$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emissivity as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif. Coatings 5 herein may have a sheet resistance of less than or equal to 10 ohms/sq., more preferably less than or equal to 5 ohms/sq.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

The invention claimed is:

1. A vehicle windshield comprising:
    first and second glass substrates laminated to one another via a polymer inclusive interlayer;
    a low-E coating provided on the first substrate, the low-E coating including from the first glass substrate outwardly at least the following layers: a layer comprising a metal oxide, a contact layer, a layer comprising silver, another contact layer, a layer comprising a metal oxide, another contact layer, another layer comprising silver, another contact layer, and a layer comprising silicon nitride;
    wherein the first glass substrate is an ion beam milled glass substrate where the ion beam milling eliminates fish-eye blemishes so that the windshield is free of fish-eye blemishes, wherein at least an interior surface of the first glass substrate located under said low-E coating is ion beam milled; and
    wherein the windshield has a visible transmittance of at least 70% and a haze value of less than or equal to 0.3.
2. The vehicle windshield of claim 1, wherein each of the first and second glass substrates are heat bent.
3. The windshield of claim 1, wherein the windshield has a haze value of less than 0.2.

* * * * *